March 22, 1955 A. SHARP ET AL 2,704,521
CONTINUOUS MIXING AND BLOCK FORMING MACHINE AND METHOD
Filed Aug. 24, 1951 3 Sheets-Sheet 1

Inventors
ALBERT SHARP
GEORGE SHARP
BY
Harry Jacobson
Attorney

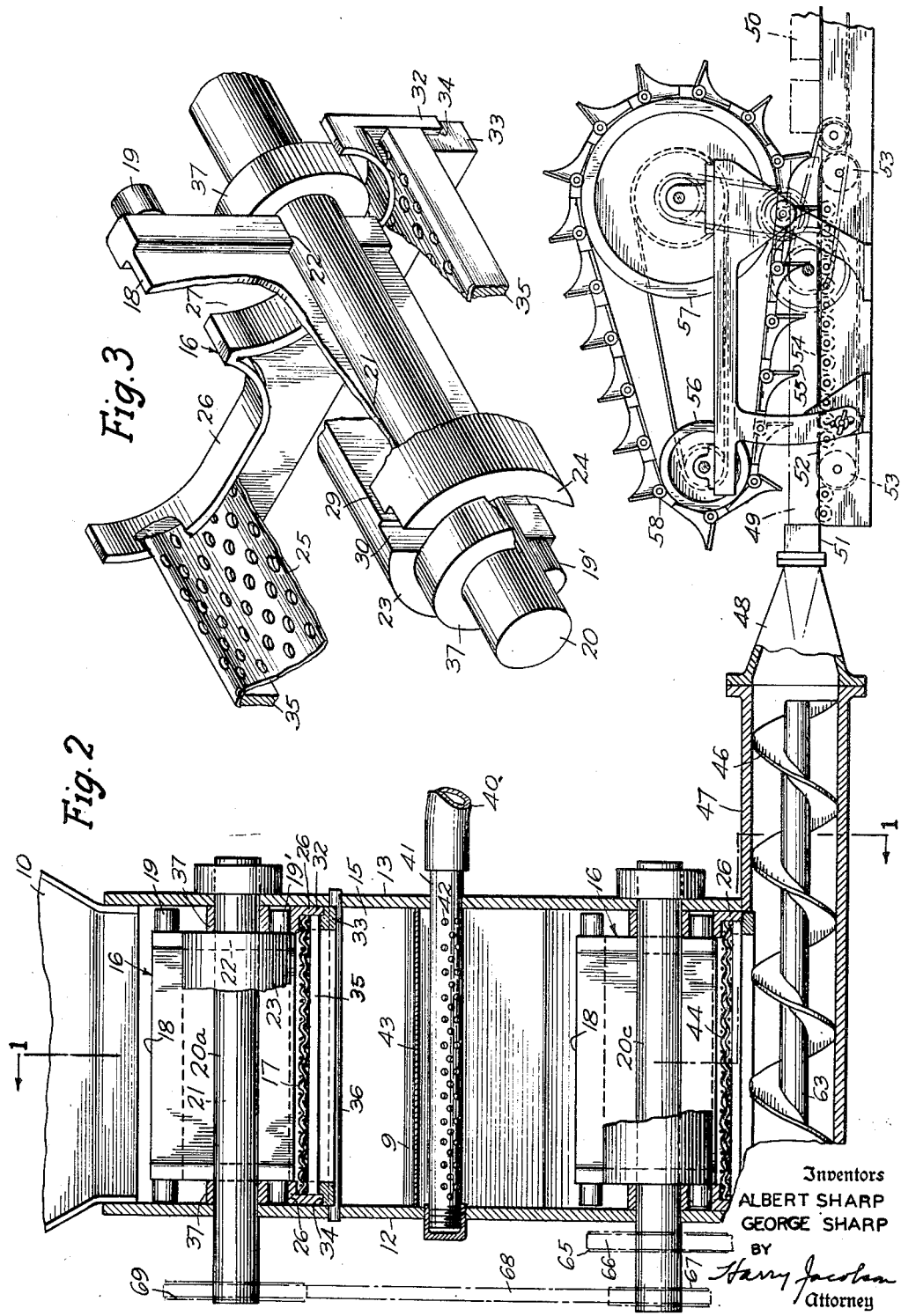

March 22, 1955 A. SHARP ET AL 2,704,521
CONTINUOUS MIXING AND BLOCK FORMING MACHINE AND METHOD
Filed Aug. 24, 1951 3 Sheets-Sheet 3

Inventors
ALBERT SHARP
GEORGE SHARP
By
Harry Jacobson
Attorney

United States Patent Office 2,704,521
Patented Mar. 22, 1955

2,704,521

CONTINUOUS MIXING AND BLOCK FORMING MACHINE AND METHOD

Albert Sharp and George Sharp, Bayonne, N. J., assignors to Sharp Bros., Inc., Bayonne, N. J., a corporation of New Jersey Application August 24, 1951, Serial No. 243,512

11 Claims. (Cl. 107—14)

This invention relates to mixing machines and processes and particularly to that type thereof designed to mix and to form continuously into blocks, masses of food or the like pasty material.

In the manufacture of certain pasty food materials such as yeast, which is peculiarly difficult to handle, it has been customary heretofore to remove the yeast from the press in which part of the moisture in the yeast is squeezed out, then to truck the yeast to a mixer or blending machine where it is necessarily mixed for a considerable period not only to blend the yeast, as by the addition thereto sometimes during mixing, of suitable ingredients such as oil, water or the like, but also to attain an even homogeneous color by breaking up and distributing any off color streaks which may be present therein. The thus mixed and blended yeast is then removed from the mixer and again trucked to another machine, such as an extruder and cutter, where the yeast is formed into blocks of the desired size. The mixing operation undesirably raises the temperature of the yeast due to the necessarily prolonged working thereof by present methods.

The present invention contemplates a considerable reduction in the mixing time, thereby to effect substantial economies in time and labor, as well as reducing the amount of needed refrigeration and cutting down to a considerable extent the rise in temperature of the yeast.

The invention also contemplates a reduction in the movement of the yeast by reducing the number of times the material is trucked from machine to machine, thereby effecting important savings in time, labor, floor space and machinery.

In our improved process, and in the machine, the material is delivered from the press and is mixed by forcing it continuously through a screen or other suitable perforated member to shred it or to break it up into particles. Then while the particles are falling and immediately thereafter, the material may be sprayed if desired, with any suitable ingredient in liquid form or carried by a liquid vehicle, then if necessary, the particles are gathered and forced a second time through a screen or other perforated member to again shred and mix the particles, the screened particles being then gathered and fed to an extruder to attain final mixing and to compact and extrude the material into a continuous and continuously moving bar, and finally the bar is cut up into blocks of the required length while the bar is in motion. It therefore becomes unnecessary to cart the mixed material to the extruder or to the cutter, our mixer, extruder and cutter forming parts of a continuous intercommunicating machine wherein the material is automatically advanced, the machine operating continuously instead of intermittently as in the separate bulky and independent machines heretofore known.

Our continuous extruder and cutter forms the subject matter of our application Serial No. 29,136, filed May 25, 1948, now Patent No. 2,613,618, dated October 14, 1952, and reference is thereby made to that application for a full and complete description thereof, which therefore need not be here repeated. We wish it to be understood however, that our new machine and process may be used for certain materials other than yeast and sometimes equally difficult to handle, so that by the word "yeast" hereinbefore used and hereinafter employed, we also mean similar materials, among which may be included soap, cheese, butter, oleomargarin and the like.

The various objects of the invention will be clear from the description which follows and from the drawings, in which Fig. 1 is a transverse vertical sectional view of the mixing and blending portion of the machine taken on the broken line 1—1 of Fig. 2, certain of the parts being broken away.

Fig. 2 is a lateral vertical sectional view of the machine taken on the line 2—2 of Fig. 1 with certain parts broken away and showing the extruder and cutter more or less diagrammatically.

Fig. 3 is a fragmentary perspective view of the shredding mechanism, showing a modified form of the screen.

In the practical embodiment of the invention shown by way of example, the hopper 10 receives the mass of yeast 11 deposited therein, and is suitably supported at the upper end of a prismatic frame which is shown in the general form of a box-like casing having opposed walls as 12 and 13 for the passage of the various shafts and removable doors as 14, 15 forming the remaining upright walls and adapted to be held in place during the operation of the machine. The walls and doors may carry any suitable guides and baffles as 9 designed to direct shredded material to the mixing blades and to reduce dead space within the frame in which yeast might accumulate without being forced to move through the machine.

Figure 1:
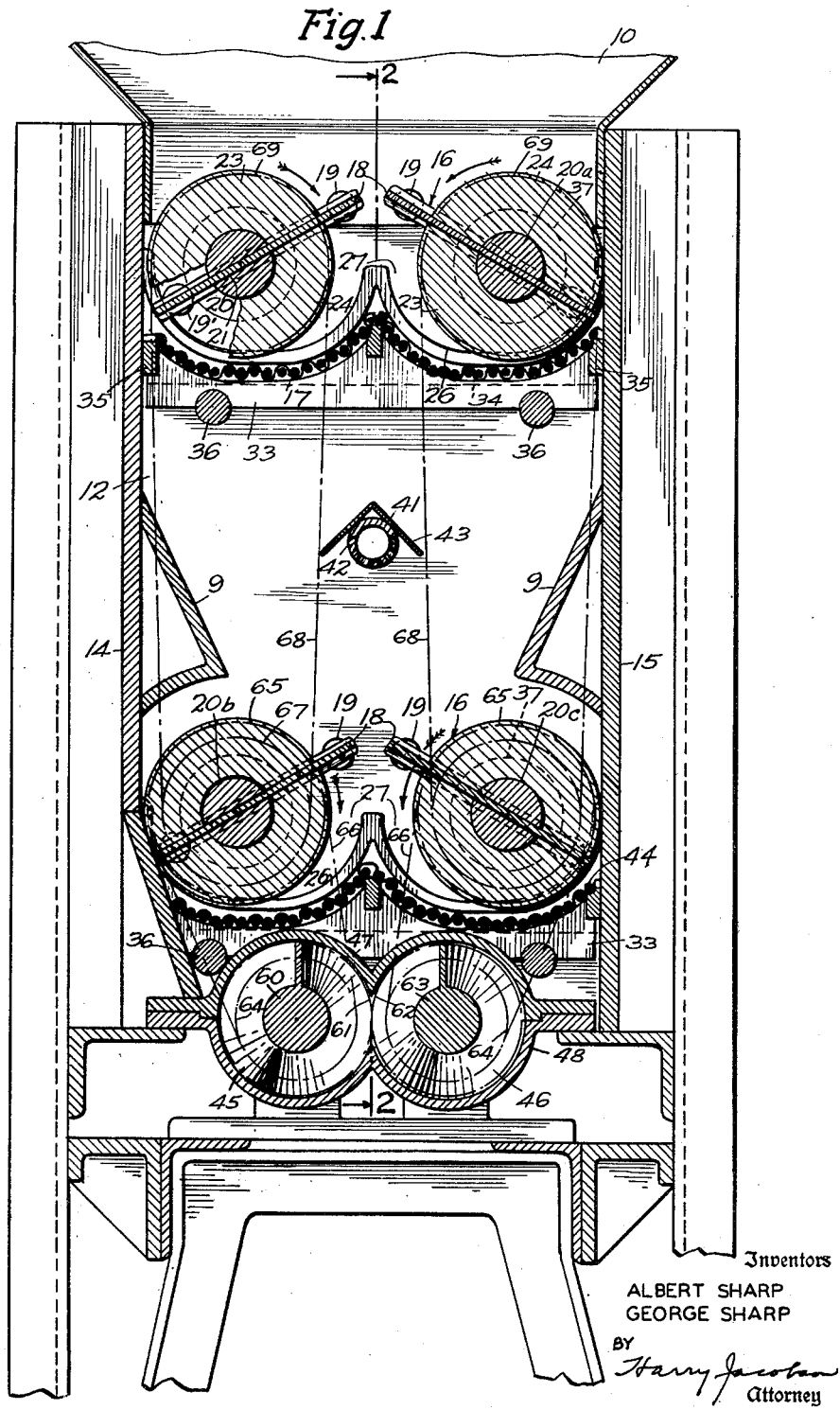
Figure 4:
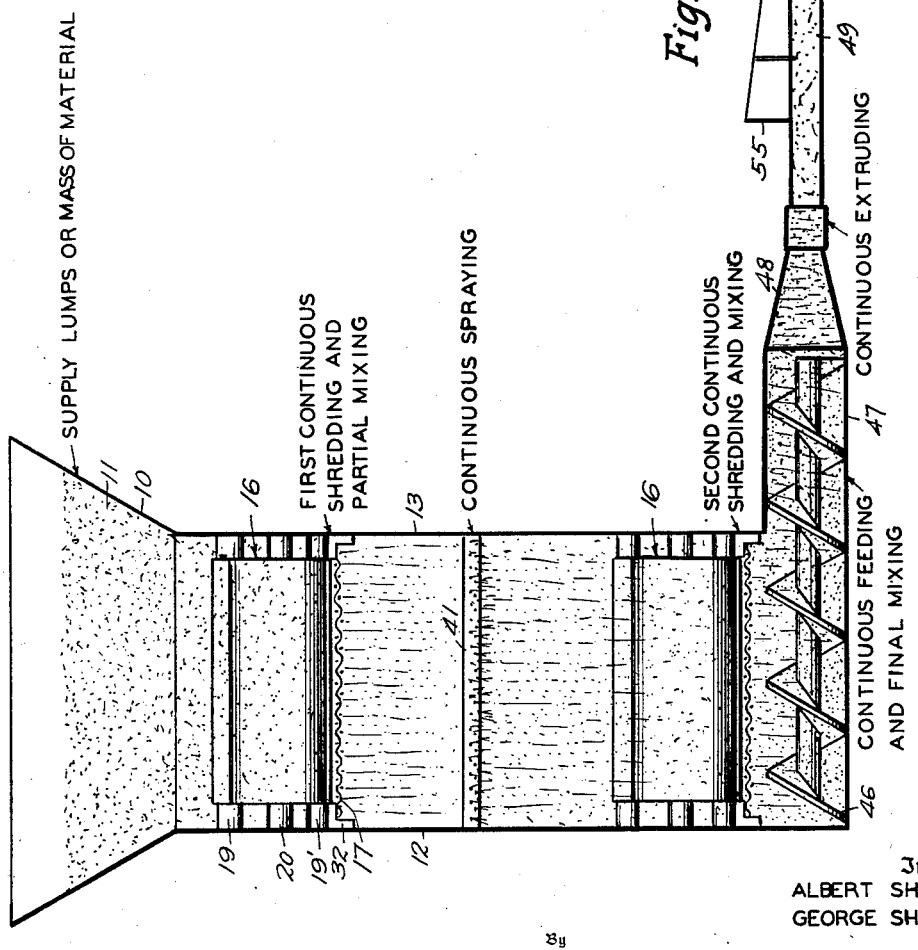
Fig. 4 is a diagrammatic view of the complete machine similar to Fig. 2 and showing the various steps of the process being carried out continuously.

The feeding and mixing mechanism designated generally by the numeral 16 is an important feature of the invention. It enables the extremely rapid shredding and mixing of large quantities of material because it handles only a relatively small amount at a time and also, permits continuous mixing and feeding though the material is deposited intermittently in the hopper. Said mechanism comprises a fixed screen 17 arranged completely across the frame and a pair of revoluble blades 18 and control means therefor, to force the yeast through the screen, thereby shredding the material or in other words, breaking it up into particles of the desired small size and permitting the particles to intermingle heterogeneously. At the side edges thereof, each blade 18 is thickened to provide enough material to support the pair of rollers 19 and 19' respectively at the end portions of the blade edges, there being four such rollers for each blade. The blade is mounted for free sliding movement through its shaft as 20 unless prevented from sliding by the engagement of its rollers with the guide cam 26. The blade therefore is loosely passed through the slot 21 in the shaft as best seen in Figs. 1 and 3, the slot being widened at its ends as at 22 to correspond to the increased thickness of the side edges of the blade. By providing a pair of similar blades 18 and control shafts 20 and 20a as well as control cam parts therefor arranged in side by side relation, and rotating the blades continuously and toward each other throughout the upper half of the rotation thereof, the upper projecting parts of the blades scoop up and trap between them and advance toward the screen 17 a relatively small quantity of material on each rotation.

To insure the forcible passage of the material through the screen, a converging passageway 27 for the material is provided between the half cylinders 23, 24 and the fixed screen 17 or perforated plate 25 (Fig. 3) or equivalent fixed perforated means. A pair of the half cylinders 23, 24 is concentric with and secured to each of the shafts 20 and 20a and each is formed with the required slot for the loose passage of the blade 18. The respective walls of such slot are continuous with the corresponding walls of the slots 21, 22 of the shaft so that the blade moves properly through the aligned slot parts 29, 30 of the half cylinders and the slot parts 21, 22 of the shaft when caused to do so by the operation of the rollers 19, 19'. One or other of the rollers of each blade is at all times in contact with one of the fixed control cams or rollers guides 26, there being two such cams. One cam is secured as by means of its depending flange 32 to the side wall 13 of the frame, and the other cam is similarly secured to the wall 12. The screen 17 or perforated plate 25, however, is secured at each side edge thereof to the upper edge of one of the screen holders 33, which is recessed to provide a longitudinal shoulder 34 thereon adapted to be pressed upwardly against the lower edge of the flange 32 of the cam. Laterally extending braces 35 connect the spaced apart screen holders 33 and also serve to support the laterally extending end edges of the screen. The screen unit consists of the pair of holders 33, the screen or the like, and the braces 35, said unit being removably supported in place as by means of the spaced apart rods 36 (Fig. 2) entering recesses in the lower edges of the holders and being removably inserted into suitable holes in the walls 12 and 13.

Since two cooperating blades or paddles are employed for blending, shredding and mixing purposes, the guide or cam for the blade rollers is symmetrical about a vertical middle line thereof, each half being concave upwardly and at its inner end each being arranged eccentrically of its blade shaft so as to move the opposite end of the blade radially outwardly into the mass of material within the walls of the machine and below the hopper as the blade shafts rotate continuously. While the screen 17 and its holders 33 are illustrated as shaped to follow the contour of the cam 26 so that the blade ends will be maintained a minimum distance from the screen, it will be understood that the screen may be substantially flat or of any other desired shape. The shape shown is preferable however, because it leaves no substantial gap between the blade ends and the screen through which the difficultly manipulatable yeast might escape instead of moving through the screen. The highest points of the cam are so arranged that one blade roller as 19' leaves the outermost part of the cam as the opposite roller 19 of the same blade engages the innermost part of the cam during the rotation of the blade shafts 20 and 20a. During the rotation of the blades in the direction of the arrows of Fig. 1, the rollers 19 are moved by the cams 26 closer to the blade shafts thereby pushing the upper parts of the blades on which the rollers 19' are mounted upwardly and outwardly out of the slots 29, 30 of the half cylinders and into the mass of material until the rollers 19' are in the extended positions thereof wherein they are ready to engage the inner part of the cams 26. The material scooped up and trapped by the projecting parts of the blades beyond the half cylinders, is deposited by the blades in the converging passageway 27 which is limited at its top by the half cylinders and at its bottom by the screen, resulting in the squeezing of the material into a smaller and smaller space in the passageway. The resulting pressure on the material forces it through the only openings provided, namely, the openings in the screen thereby effectively shredding the material into the desired small particles. Inward movement of the rollers is prevented by the collars 37 fixed to the outer parts of the shafts 20 and 20a beyond the half cylinders 23 and 24 and inwardly of the rollers, the diameters of the collars being such that the lower ends of the blades are always maintained quite close to the screen to make dependable and certain the shredding of the material.

As the particles of shredded material fall out of the screen, they may optionally be sprayed with water, oil or other blending material, as by means of a suitable connection 40 leading such material under pressure to the pipe 41. Said pipe is fixed in the walls 12 and 13 of the frame, and is provided with a number of spraying holes 42 through which the blending material is discharged upon the falling particles and upon those particles falling or sliding upon the baffles 9 or the lower set of blades or on the lower half cylinders. A suitable steeply inclined shield 43 for the spraying pipe causes the material tending to accumulate thereon to slide off. Obviously, a suitable valve may be provided in the pipe to cut off the spray completely or partially as may be found convenient. The lower feeding and mixing mechanism 16 is substantially identical with the corresponding upper mechanism and hence need not be again described in detail except to say that the shafts 20b and 20c therefore are rotated continuously toward each other in the same manner as the shafts 20 and 20a. The lower screen 44 is substantially identical with the screen 17, but may be entirely omitted if desired. If it is employed, the screen 44 performs a second shredding operation upon the material and causes the particles to intermingle and reunite in a different pattern as they fall on to the feed worms 45, 46, additional mixing being attained by such action.

Said worms are rotated continuously toward each other, in the same manner as each pair of blades, by the driving mechanism later to be described. The worm 45 is right hand while the other worm 46 is left hand, said worms serving to feed the material into the double cylindrical casing 47 and thence into the converging extruding nozzle 48. The worms and nozzle cooperate to compact the particles, to give them a final mixing and to extrude the compacted material into a continuous bar 49 of the required cross sectional preferably rectangular size and shape. The continuously moving bar is then cut into blocks 50 of the size desired and in the preferred form of right rectangular prisms, after which the individual blocks may be wrapped or otherwise packaged in any suitable manner. For a complete description of the extruding nozzle and the continuous block cutting mechanism, reference is made to our copending application Serial No. 29,136 hereinbefore referred to. Suffice it to say that the nozzle 48 is secured at its larger end to the worm casing 47 and is open and adjustable at its smaller discharge end 51. From the nozzle, the block moves on to the conveyor belt 52 and advances said belt, which is suitably supported by belt pulleys and intermediate rollers 54. During the advance of the belt, the lowermost spaced blades 55 of the blade chain move downwardly into the bar 49 and cut it into blocks, the chain being moved only by the moving bar. However, means are provided for rendering the chain extremely sensitive to movement of the bar. This is done by positively rotating the chain-supporting wheels 56 and 57 by the sprocket wheels, sprocket chains, gearing and motor indicated in Fig. 2, the wheels rotating in the direction of movement of the chain without any connection therebetween. Suitable rollers 58 in the chain links merely rotate and rest on the chain wheels without any bodily forward or backward movement except that imparted by the movement of the bar 49. Said rollers, when rotating, substantially eliminate any friction of the chain on the chain wheels and hence render the chain quite sensitive to advance by the engagement of the bar of material with one or more of the chain blades.

To rotate the shafts 20, 20a, 20b and 20c and the worms 45 and 46, one worm shaft as 60 (Fig. 1) is driven by a suitable motor and reduction gearing, not shown, and carries a gear wheel 61 meshing with a similar gear wheel 62 on the worm shaft 63. Each of the worm shafts carries a sprocket wheel 64 driving a sprocket wheel 65 on one of the lower shafts 20b or 20c through a chain 66. On each lower blade shaft 20b and 20c is another sprocket wheel 67 driving the corresponding upper shaft 20 or 20a by means of a chain 68 and a sprocket wheel 69 on said upper shaft.

It will now be seen that we have provided a relatively simple and economical machine and process for mixing, blending, extruding and cutting into blocks automatically and continuously, masses of material ordinarily difficult to handle, such as yeast, that the operation of transferring the mass from a mixer to an extruder is eliminated with resulting economies of space, time, labor and refrigeration, and that the process and apparatus are well designed to meet severe commercial requirements.

While certain specific embodiments of the invention have herein been shown and described, various obvious changes may be made therein without departing from the spirit of the invention defined in the appended claims.

We claim:

1. In apparatus of the character described, a pair of revoluble and transversely slidable mixing blades, means for rotating the blades in opposite directions to move massed pasty coherent and adherent material in the path of each blade toward the other blade and toward the screen hereinafter mentioned, fixed means in part eccentric to the axis of rotation of each blade for sliding said blade radially of said axis during the rotation of the blade thereby to force positively the material through the screen to shred the material into lengths of predetermined thickness, a screen adjacent the path of the end edges of the blades, means for feeding toward an extruding position and compacting into a mass, the shreds of the material forced through the screen by the blades, means for extruding the fed material into a continuously moving bar of rectangular cross section, and means for continuously cutting the moving bar into blocks in the shape of right rectangular prisms.

2. In apparatus of the character described, the revoluble and transversely movable material-moving means comprising a continuously revoluble shaft having a slot therethrough, a blade fitted into and passing loosely through the slot and revoluble with the shaft, a pair of spaced apart rollers on each end edge of the blade and respectively on opposite sides of the shaft, and a pair of similar fixed and spaced apart cams around the lower half of the shaft, each cam being engaged by the respective rollers of the nearer pair of rollers alternately on successive half revolutions of the shaft.

3. The apparatus of claim 2, the inner part of each cam being arranged eccentrically of the shaft and converging outwardly toward the shaft, a slotted half cylindrical member secured to, concentric with and arranged around the shaft at one face of the blade, and a second half cylindrical member secured to, concentric and arranged around the shaft at the opposite face of the blade.

4. The apparatus of claim 2, and a fixed perforated member between the cams and substantially parallel to the cam surfaces of the cams and adjacent the path of movement of the lower end edge of the blade compacting means comprising a pair of continuously revoluble worms, and the bar forming means comprising a tapered nozzle.

5. In apparatus of the character described, a fixed perforated member adapted to shred and mix pasty material forced therethrough, and means for forcing said material under pressure through the member comprising a pair of blades adjacent the member, means for continuously rotating the blades in opposite directions, and means including cams and cam followers on the blades for moving the blades transversely during the rotation thereof and relatively to the rotating means, said blade-moving means moving corresponding respective end edges of the blades in paths sufficiently close to each other to trap and to move the material between the blades.

6. The apparatus of claim 5, a second perforated member in downward spaced relation to the first-mentioned perforated member, a second pair of blades adjacent the second member, means for continuously rotating the second pair of blades in opposite directions, and means including fixed cams and cam followers carried by the second pair of blades and engaging the fixed cams for moving the second pair of blades transversely.

7. The apparatus of claim 5, the blade rotating means comprising a slotted shaft for each blade, a pair of half cylinders arranged respectively on opposite sides of the blade and carried by the shaft, the blade passing through the shaft and passing loosely between the cylinders and projecting beyond both sides of the cylinders, part of the perforated member being concentric with and arranged relatively close to the shaft and the remainder of said member being eccentric to and spaced further from the shaft.

8. In mechanism of the character described, yeast shredding means comprising a shaft having a longitudinal slot completely through a diameter thereof and extending from one end portion of the shaft to the other end portion thereof and having flat side walls, means for rotating the shaft continuously in one direction, a first half cylinder rotatable with the shaft and having a flat face substantially coplanar with and forming a continuation of one flat side wall of the shaft slot, a second half cylinder rotatable with the shaft and having a flat face substantially coplanar with the other flat side wall of the shaft slot, an imperforate blade of greater width than the diameter of the shaft passing completely through the shaft slot and projecting past both sides of the slot, and a perforated member functioning as a screen having a portion thereof adjacent the lateral surfaces of the half cylinders and having the remainder thereof arranged eccentrically of the half cylinders and means for securing the half cylinders together in spaced relation to each other to form a slot constituting a continuation of the shaft slot and coextensive with the length of the blade.

9. In mechanism of the character described, yeast shredding means comprising a shaft having a longitudinal slot completely through a diameter thereof, means for rotating the shaft, a first half cylinder rotatable with the shaft and having a flat face substantially coplanar with and forming a continuation of one flat side wall of the shaft slot, a second half cylinder rotatable with the shaft and having a flat face substantially coplanar with the other side wall of the shaft slot, an imperforate blade of greater width than the diameter of the shaft passing completely through the shaft slot and projecting past both sides of the shaft slot, and a perforated member functioning as a screen having a portion thereof adjacent the lateral surfaces of the half cylinders and having the remainder thereof arranged eccentrically of the half cylinders, and means for moving the blade transversely of and in the shaft slot and maintaining one of the side edges of the blade adjacent the perforated member, said means comprising a fixed cam adjacent an end edge of the blade, a pair of spaced cam followers on said end edge, and a collar on the shaft of lesser diameter than that of the half cylinders and arranged between the cam followers, said collar and cam determining the position of the blade in the slot.

10. In apparatus of the character described, a screen, revoluble mixing means, fixed means for moving the mixing means radially of the axis of revolution thereof during the revolution of the mixing means to force pasty material through the screen and thereby to shred and to mix the material, a second screen, a second revoluble mixing means, fixed means for moving the second mixing means radially of the axis of revolution thereof during the revolution of said second mixing means to force the shredded material in the path of said second mixing means through the second screen, means receiving the shredded material from said second screen for continuously forming the material into a continuously moving bar, and means for cutting the bar into blocks having flat ends perpendicular to the axis of the block and of the bar, said bar-cutting means comprising a conveyor receiving the moving bar and being movable longitudinally of and by the bar, a cutter movable into the path of and engageable by the bar and means supporting the cutter for movement longitudinally of the conveyor by the bar and at the same speed as the conveyor when the cutter is engaged by the bar, said supporting means also moving the cutter transversely of and through the bar during the longitudinal movement of the cutter.

11. The method of mixing a coherent mass of yeast or the like pasty material comprising forcibly shredding the material into particles, collecting the particles into a mass, again forcibly shredding the collected mass into particles, again collecting the shredded particles and extruding the particles into a continuously moving bar of predetermined cross sectional shape, and cutting the moving bar into blocks having end surfaces perpendicular to the direction of movement of the bar by first interposing a cutter into the path of the moving bar to cause the cutter to move with the bar longitudinally, and while the bar continues to move the cutter longitudinally at the same speed as the bar also moving the cutter transversely through the bar to sever a block therefrom.

References Cited in the file of this patent

UNITED STATES PATENTS

| Number | Name | Date |
|---|---|---|
| 509,987 | Wilcox | Dec. 5, 1893 |
| 1,469,142 | Funk | Sept. 25, 1923 |
| 1,657,457 | Copland | Jan. 31, 1928 |
| 1,700,510 | Aches | Jan. 29, 1929 |
| 1,748,543 | Devlin | Feb. 25, 1930 |
| 1,790,347 | Hawkins | Jan. 27, 1931 |
| 1,879,327 | Kremmling | Sept. 27, 1932 |
| 2,036,094 | Patt | Mar. 31, 1936 |
| 2,073,567 | Sciarra | Mar. 9, 1937 |